(12) United States Patent
Tsuruta et al.

(10) Patent No.: US 10,804,553 B2
(45) Date of Patent: Oct. 13, 2020

(54) FUEL CELL SYSTEM

(71) Applicant: TOYOTA JIDOSHA KABUSHIKI KAISHA, Toyota-shi, Aichi-ken (JP)

(72) Inventors: Yoshiaki Tsuruta, Nagakute (JP); Satoshi Watanabe, Okazaki (JP); Hideyuki Kumei, Sunto-gun (JP); Shuya Kawahara, Toyota (JP); Kohei Oda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/806,575

(22) Filed: Nov. 8, 2017

(65) Prior Publication Data

US 2018/0145356 A1 May 24, 2018

(30) Foreign Application Priority Data

Nov. 21, 2016 (JP) .................................. 2016-226099

(51) Int. Cl.
*H01M 8/04858* (2016.01)
*H01M 8/04828* (2016.01)
(Continued)

(52) U.S. Cl.
CPC ......... *H01M 8/04932* (2013.01); *B60L 1/003* (2013.01); *B60L 58/12* (2019.02);
(Continued)

(58) Field of Classification Search
CPC .. B60L 11/1887; B60L 1/003; B60L 2210/14; H01M 16/006; H01M 2250/20; H01M 8/04552; H01M 8/04932
See application file for complete search history.

(56) References Cited

U.S. PATENT DOCUMENTS 3,471,337 A    10/1969   Fetterman
5,935,726 A     8/1999   Chow et al.
(Continued)

FOREIGN PATENT DOCUMENTS

JP    H07-235324 A    9/1995
JP    2007-103115 A    4/2007
(Continued)

OTHER PUBLICATIONS

U.S. Appl. No. 15/725,651, filed Oct. 5, 2017.
(Continued)

*Primary Examiner* — Adam A Arciero
(74) *Attorney, Agent, or Firm* — Finnegan, Henderson, Farabow, Garrett & Dunner, LLP

(57) ABSTRACT

A fuel cell system according to one embodiment performs refresh control of an electrode catalyst of a fuel cell, by reducing a stack voltage as a voltage of the fuel cell to a refresh voltage at which the electrode catalyst is activated. The system includes the fuel cell that generates electric power by an electrochemical reaction using fuel gas and oxidation gas, a stack voltage sensor that sensors the stack voltage, and a controller that controls power of the fuel cell. When a high load demand that makes the stack voltage lower than a given voltage is made on the fuel cell, the controller causes the fuel cell to deliver power commensurate with the high load demand, and performs refresh control when the stack voltage becomes lower than the given voltage through the above control.

6 Claims, 9 Drawing Sheets

(51) Int. Cl.
   *H01M 8/04537*   (2016.01)
   *H01M 8/04223*   (2016.01)
   *B60L 58/12*   (2019.01)
   *B60L 58/40*   (2019.01)
   *B60L 1/00*   (2006.01)
   *H01M 16/00*   (2006.01)

(52) U.S. Cl.
   CPC ........... *B60L 58/40* (2019.02); *H01M 8/0494* (2013.01); *H01M 8/04238* (2013.01); *H01M 8/04552* (2013.01); *H01M 8/04559* (2013.01); *H01M 8/04604* (2013.01); *H01M 16/006* (2013.01); *B60L 2210/14* (2013.01); *B60L 2240/54* (2013.01); *B60L 2250/26* (2013.01); *H01M 2250/20* (2013.01); *Y02T 90/32* (2013.01)

(56) References Cited

U.S. PATENT DOCUMENTS

| | | |
|---|---|---|
| 5,998,054 A | 12/1999 | Jones et al. |
| 5,998,058 A | 12/1999 | Fredley |
| 6,103,412 A | 8/2000 | Hirano et al. |
| 6,258,198 B1 | 7/2001 | Saito et al. |
| 6,258,476 B1 | 7/2001 | Cipollini |
| 6,284,399 B1 | 9/2001 | Oko et al. |
| 6,376,110 B1 | 4/2002 | Koschany |
| 6,709,777 B2 | 3/2004 | Hagans et al. |
| 6,753,106 B2 | 6/2004 | Chow et al. |
| 6,841,283 B2 | 1/2005 | Breault |
| 7,112,379 B2 | 9/2006 | Skiba |
| 7,132,192 B2 | 11/2006 | Muthuswamy et al. |
| 8,932,775 B2* | 1/2015 | Hamada ............ H01M 8/04388 429/413 |
| 2002/0009623 A1 | 1/2002 | St-Pierre et al. |
| 2005/0053814 A1 | 3/2005 | Imamura et al. |
| 2005/0147853 A1 | 7/2005 | Kaufmann et al. |
| 2005/0158610 A1 | 7/2005 | Keegan |
| 2005/0260463 A1 | 11/2005 | Chapman et al. |
| 2006/0008695 A1 | 1/2006 | Bai et al. |
| 2007/0179636 A1 | 8/2007 | Shige |
| 2008/0138689 A1 | 6/2008 | Leo et al. |
| 2008/0248351 A1 | 10/2008 | Wake et al. |
| 2010/0068577 A1* | 3/2010 | Umayahara ....... H01M 8/04238 429/432 |
| 2010/0092819 A1 | 4/2010 | Umayahara et al. |
| 2010/0112401 A1* | 5/2010 | Noto ................. H01M 8/04223 702/63 |
| 2010/0151341 A1* | 6/2010 | Manabe ............ H01M 8/04089 429/431 |
| 2010/0167141 A1 | 7/2010 | Son et al. |
| 2011/0003221 A1 | 1/2011 | Mizuno |
| 2011/0129751 A1* | 6/2011 | Nagahara .......... H01M 8/04932 429/432 |
| 2011/0294026 A1 | 12/2011 | Hamada et al. |
| 2012/0225330 A1 | 9/2012 | Umayahara et al. |
| 2015/0104721 A1 | 4/2015 | Choo et al. |
| 2015/0111122 A1* | 4/2015 | Matsusue .......... H01M 8/04992 429/432 |
| 2015/0180070 A1* | 6/2015 | Matsusue .......... H01M 8/04225 429/432 |
| 2018/0108926 A1* | 4/2018 | Tsuruta ............. H01M 8/04953 |

FOREIGN PATENT DOCUMENTS

| | | |
|---|---|---|
| JP | 2007-149572 A | 6/2007 |
| JP | 2008-192468 A | 8/2008 |
| JP | 2008-218340 A | 9/2008 |
| JP | 2009-016331 A | 1/2009 |
| JP | 2009-176666 A | 8/2009 |
| JP | 2010-118252 | 5/2010 |
| JP | 2012-185968 | 9/2012 |
| JP | 2013-101844 A | 5/2013 |
| JP | 2013-105654 A | 5/2013 |
| JP | 2013-161571 A | 8/2013 |
| JP | 2013-232361 | 11/2013 |
| JP | 2013-243009 A | 12/2013 |
| JP | 2014-078412 A | 5/2014 |
| JP | 2014-212018 A | 11/2014 |
| JP | 2015-79729 | 4/2015 |
| JP | 2016-152227 A | 8/2016 |
| WO | WO2013/128609 A1 | 9/2013 |

OTHER PUBLICATIONS

Office Action issued in U.S. Appl. No. 12/801,239 dated May 24, 2012.

Advisory Action issued in U.S. Appl. No. 12/801,239 dated Feb. 28, 2013.

Final Office Action issued in U.S. Appl. No. 12/801,239 dated Nov. 6, 2012.

International Search Report issued in PCT/US2011/037516 dated Jul. 11, 2011.

Notice of Allowance issued in U.S. Appl. No. 12/801,239 dated Sep. 12, 2014.

Office Action issued in U.S. Appl. No. 15/725,651 dated Jun. 17, 2019.

Notice of Allowance issued in U.S. Appl. No. 15/725,651 dated Sep. 23, 2019.

* cited by examiner

FUEL CELL SYSTEM

INCORPORATION BY REFERENCE

The disclosure of Japanese Patent Application No. 2016-226099 filed on Nov. 21, 2016 including the specification, drawings and abstract is incorporated herein by reference in its entirety.

BACKGROUND

1. Technical Field

The disclosure relates to a fuel cell system, and relates to a fuel cell system that performs refresh control for recovering activity of an electrode catalyst, for example.

2. Description of Related Art

A fuel cell system described in Japanese Patent Application Publication No. 2013-232361 (JP 2013-232361 A) performs refresh control, by controlling a stack potential of a fuel cell to about 0.6V, and removing an oxide layer on a surface of an electrode catalyst, such as platinum (Pt), for example, so as to recover activity of the electrode catalyst.

SUMMARY

The fuel cell system described in JP 2013-232361 A recovers the activity of the electrode catalyst through the refresh control, in the short-term future, but the electrode catalyst may not exhibit the initial performance over the long term, since operation to control the stack potential to a low potential is repeated, resulting in coarsening of particles of the electrode catalyst, and reduction of the surface area of the electrode catalyst.

Also, in the fuel cell system as described above, the stack potential may be lowered (to about 0.8V) when a high load demand is generated. In this case, too, the electrode catalyst may degrade over the long term.

This disclosure provides a fuel cell system that can activate a catalyst while curbing degradation of the catalyst.

A fuel cell system according to one aspect of the disclosure includes a fuel cell that generates electric power by an electrochemical reaction using a fuel gas and an oxidation gas, a stack voltage sensor that sensors a stack voltage as a voltage of the fuel cell, and a controller that controls power of the fuel cell. The controller performs refresh control of an electrode catalyst of the fuel cell, by reducing the stack voltage to a refresh voltage at which the electrode catalyst is activated. When a high load demand that makes the stack voltage lower than a given voltage is made on the fuel cell, the controller causes the fuel cell to deliver the power commensurate with the high load demand, and performs the refresh control when the stack voltage becomes lower than the given voltage. The fuel cell system thus configured performs refresh control, taking advantage of the time when the stack voltage crosses the given voltage in response to the high load demand. Therefore, the stack voltage does not need to cross the given voltage solely for the sake of the refresh control, and the number of times the stack voltage crosses the given voltage can be reduced. Accordingly, it is possible to activate the electrode catalyst, while curbing degradation of the electrode catalyst.

The above-indicated refresh voltage may be equal to or lower than the given voltage. In this case, degradation of the electrode catalyst can be curbed.

The given voltage may be the stack voltage obtained from a relationship between the stack voltage at which the refresh control is started, and an amount of degradation of the electrode catalyst when the refresh control is performed. The given voltage may be the stack voltage at or above which the degradation of the electrode catalyst may occur due to the refresh control. With this configuration, degradation of the electrode catalyst can be further curbed.

The fuel cell system may further include a battery operable to be charged with power and discharge power. In a case where the high load demand is generated, the controller may perform the refresh control through current sweep for drawing electric current from the fuel cell, when the power generated by the refresh control using the current sweep is equal to or smaller than the power with which the battery can be charged. With this configuration, unintended acceleration of the vehicle can be curbed.

The fuel cell system may further include a battery operable to be charged with power and discharge power. In a case where the high load demand is generated, the controller may keep the fuel cell from generating electric power, when the power generated by the refresh control using current sweep for drawing electric current from the fuel cell is larger than the power with which the battery can be charged, cause the battery to deliver the power commensurate with the high load demand, and then perform the refresh control through the current sweep, when the power generated by the refresh control using the current sweep is equal to or smaller than the power with which the battery can be charged. With this configuration, the battery delivers power commensurate with the high load demand, and the refresh control can be performed when the battery becomes able to be charged.

The fuel cell system may further include a battery operable to be charged with power and discharge power. In a case where the high load demand is generated, the controller may keep the fuel cell from generating electric power, when the power generated by the refresh control through current sweep for drawing electric current from the fuel cell is larger than the power with which the battery can be charged, cause the battery to deliver the power commensurate with the high load demand, and then perform the refresh control by reducing the oxidation gas, when the power generated by the refresh control using the current sweep is still larger than the power with which the battery can be charged, and, where the high load demand is not made on the fuel, and the power commensurate with the high load demand, for a case where the high load demand is generated again, is equal to or smaller than the power that can be delivered by the battery. With this configuration, insufficient acceleration of the vehicle can be curbed.

In the fuel cell system, an amount of degradation of the electrode catalyst when the refresh control is performed at the stack voltage equal to or higher than the given voltage may be equal to or larger than the amount of degradation of the electrode catalyst when the refresh control is performed at the stack voltage smaller than the given voltage.

According to one aspect of the disclosure, the fuel cell system that can activate the electrode catalyst, while curbing degradation of the electrode catalyst, is provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The best mode for carrying out the disclosure will be described with reference to the accompanying drawings. It is, however, to be understood that the disclosure is not limited to the following embodiment. Also, the following description and the drawings are appropriately simplified, for the sake of clarity of explanation.

A fuel cell system according to the embodiment will be described. The fuel cell system of this embodiment is installed on a fuel cell vehicle (FCV), for example. However, the fuel cell system is not limitedly used in a vehicle, such as a fuel cell vehicle or a hybrid vehicle, but may be used in various types of moving vehicles, such as a two-wheel vehicle.

Figure 1:
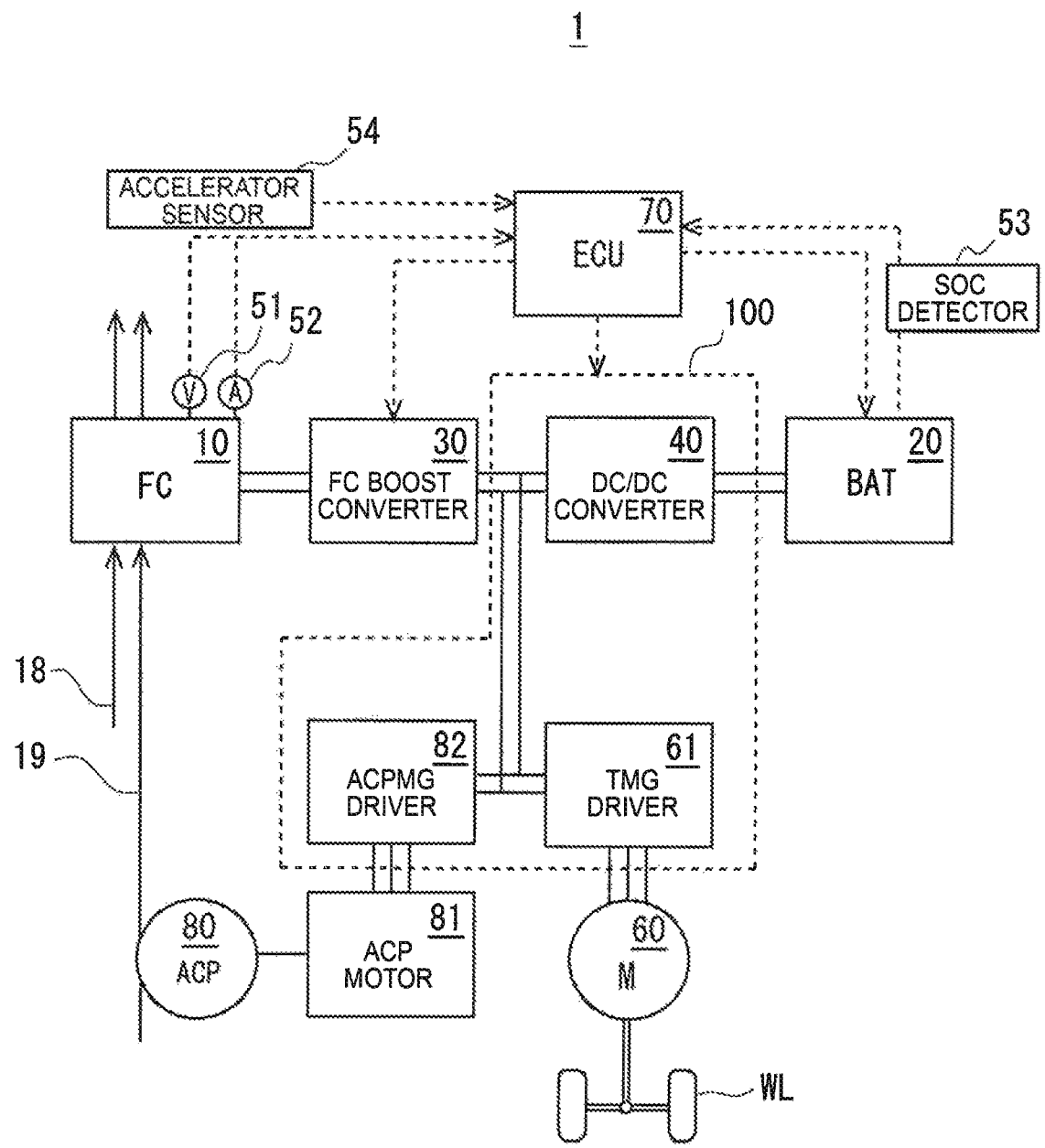
FIG. 1 is a configuration diagram illustrating a fuel cell system according to one embodiment.

The configuration of the fuel cell system will be described. FIG. 1 is a configuration diagram illustrating the fuel cell system according to this embodiment. As shown in FIG. 1, the fuel cell system 1 has a fuel cell stack 10 (which will be called "FC stack 10"), battery 20, FC boost converter 30, DC/DC converter 40, driving motor 60, driving motor driver 61 (TMG driver 61), controller 70, air compressor 80, motor 81 for the air compressor (which will be called "ACP motor 81"), and a motor driver 82 for the air compressor (which will be called "ACPMG driver 82"). The DC/DC converter 40, TMG driver 61, and the ACPMG driver 82 will be collectively called "power control unit 100" (which will be called "PCU 100").

Figure 2:
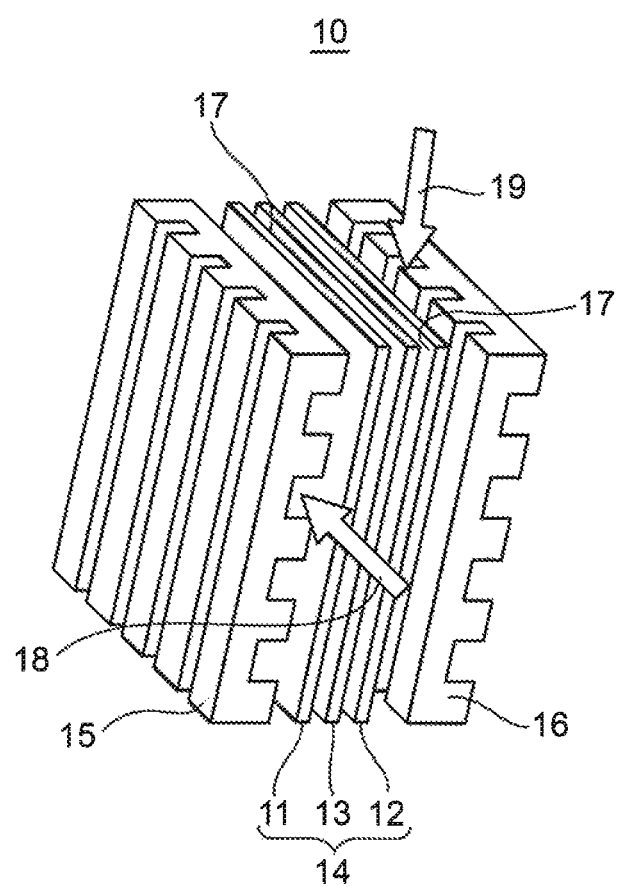
FIG. 2 is a view showing a cell of an FC stack according to the embodiment.

FIG. 2 shows a cell of the FC stack 10 according to this embodiment. As shown in FIG. 2, the cell of the FC stack 10 has a membrane-electrode assembly (which will be called "MEA") 14, anode-side separator 15, and a cathode-side separator 16. The MEA 14 includes an anode electrode 11, a cathode electrode 12, and a polymer electrolyte membrane 13. The anode electrode 11 and the cathode electrode 12 have an electrode catalyst 17. The MEA 14 is configured such that the anode electrode 11 and cathode electrode 12 having the electrode catalyst 17 are located on opposite surfaces of the polymer electrolyte membrane 13.

Fuel gas 18 is supplied to between the anode electrode 11 and the anode-side separator 15. The fuel gas 18 is, for example, hydrogen gas. Oxidation gas 19 is supplied to between the cathode electrode 12 and the cathode-side separator 16. The oxidation gas 19 is, for example, air containing oxygen. Thus, the fuel gas 18 is supplied to the anode electrode 11 of the FC stack 10, and the oxidation gas is supplied to the cathode electrode 12. The hydrogen supplied to the anode electrode 11 is activated by the electrode catalyst 17 on the anode electrode 11, and emits electrons. Then, the electrons released from hydrogen flow from the anode electrode 11 to the cathode electrode 12, so that electricity is generated. In the meantime, the hydrogen that has emitted electrons becomes hydrogen ions. The hydrogen ions pass through the polymer electrolyte membrane 13 from the anode electrode 11 side, and move toward the cathode electrode 12. Then, oxygen in the air, hydrogen ions, and electrons are combined, in the electrode catalyst 17 of the cathode electrode 12. As a result, water is produced. In this manner, the FC stack 10 generates electric power, through electrochemical reactions using the fuel gas 18 including hydrogen, for example, and the oxidation gas 19 including oxygen in the air. The voltage and current of the FC stack 10 will be called "stack voltage Vs" and "stack current As".

The electrode catalyst 17 provided on one side of each of the anode electrode 11 and the cathode electrode 12 facing the polymer electrolyte membrane 13 contains platinum (Pt), for example, as a material. The electrode catalyst 17 is not limited to platinum, but may contain a platinum-cobalt alloy.

Referring back to FIG. 1, a stack voltage sensor 51 that senses the stack voltage Vs, and a stack current sensor 52 that senses the stack current As, are mounted to the FC stack 10. The stack voltage sensor 51 and the stack current sensor 52 are connected to a controller 70 via information transmitting means (which will be referred to as "signal line(s), or the like"), such as signal lines, or by air (or over the wireless). The controller 70 measures the stack voltage Vs and power of the FC stack 10, via the stack voltage sensor 51 and the stack current sensor 52. The FC stack 10 is connected to the FC boost converter 30, via DC (direct-current) wiring, for example.

The FC boost converter 30 is connected to the DC/DC converter 40, TMG driver 61, and the ACPMG driver 82 via DC wiring. The FC boost converter 30 raises the stack voltage Vs of the FC stack 10 to a voltage that can be used in the TMG driver 61 and the ACPMG driver 82. The FC boost converter 30 is connected to the controller 70 via a signal line, or the like. The controller 70 controls the stack voltage Vs and power of the FC stack 10, via the FC boost converter 30, referring to the stack voltage Vs and power of the FC stack 10.

The battery 20 is a secondary battery that can be charged with electric power and can discharge power, for example. The battery 20 functions to store excess power in the fuel cell system 1, store regenerative power during regenerative braking, and provide auxiliary power during acceleration of the vehicle on which the FC stack 10 is installed. The battery 20 is, for example, a nickel-cadmium storage battery, nickel-hydrogen storage battery, lithium secondary battery, or the like. An SOC (State Of Charge) detector 53 for monitoring the remaining capacity is mounted to the battery 20. The SOC detector 53 is connected to the controller 70 via a signal line, or the like. The controller 70 measures the remaining capacity of the battery 20, referring to the SOC detector 53.

The DC/DC converter 40 is connected to between the battery 20 and the FC boost converter 30 via DC wiring. Also, the DC/DC converter 40 is connected to the TMG driver 61 and the ACPMG driver 82 via DC wiring. When the battery 20 is in a discharging state, the DC/DC converter 40 converts the output voltage of the battery 20 to a high voltage that can be used in the TMG driver 61 and the ACPMG driver 82. When the battery 20 is in a charged state, the DC/DC converter 40 converts the output voltage of the FC boost converter 30, to a voltage with which the battery 20 can be charged. When regenerative electric power is generated in the driving motor 60, the regenerative power is converted into DC power by the TMG driver 61, and then supplied to the battery 20 via the DC/DC converter 40.

The TMG driver 61 is connected to the FC boost converter 30 and the DC/DC converter 40 via DC wiring. The TMG driver 61 is connected to the driving motor 60 for driving the wheels WL, via three-phase AC wiring. The TMG driver 61 converts power of the FC stack 10 supplied via the FC boost converter 30, and power of the battery 20 supplied via the DC/DC converter 40, into three-phase alternating current, and supplies it to the driving motor 60.

The ACPMG driver 82 is connected to the FC boost converter 30 and the DC/DC converter 40 via DC wiring. The ACPMG driver 82 is connected to the ACP motor 81 via three-phase AC wiring. The ACPMG driver 82 converts power of the FC stack 10 supplied via the FC boost converter 30, and power of the battery 20 supplied via the DC/DC converter 40, into three-phase alternating current, and supplies it to the ACP motor 81.

The DC/DC converter 40, TMG driver 61, and the ACPMG driver 82 constitute the PCU 100. The PCU 100 is connected to the controller 70 via a signal line, or the like. The controller 70 controls operation of the DC/DC converter 40, TMG driver 61, and the ACPMG driver 82, via the PCU 100.

The driving motor 60 is, for example, a three-phase AC motor that drives the wheels WL. The driving motor 60 functions as a power source of the vehicle on which the FC stack 10 is installed. The rotational speed of the driving motor 60 is controlled by the controller 70 via the TMG driver 61. Also, the driving motor 60 generates regenerative power through regenerative braking.

The ACP motor 81 is, for example, a three-phase AC motor. The ACP motor 81 drives the air compressor 80. The rotational speed of the ACP motor 81 is controlled by the controller 70 via the ACPMG driver 82. In this manner, the controller 70 controls supply of the oxidation gas 19 from the air compressor 80 to the FC stack 10.

The air compressor 80 takes in the oxidation gas 19 from the atmosphere, and supplies it to the FC stack 10. The fuel gas 18 is also supplied to the FC stack 10. The fuel gas 18 is supplied from a high-pressure hydrogen tank (not shown), for example. Also, a coolant channel (not shown) is provided around the FC stack 10, and a coolant for cooling the FC stack 10 is supplied to the FC stack 10.

The controller 70 controls the stack voltage Vs and power of the FC stack 10, via the FC boost converter 30, referring to the stack voltage Vs and power of the FC stack 10, via the stack voltage sensor 51 and the stack current sensor 52. The controller 70 measures the remaining capacity of the battery 20, referring to the SOC detector 53. The controller 70 controls charge and discharge of the battery 20, via the DC/DC converter 40.

An accelerator sensor 54 is connected to the controller 70 via a signal line, or the like. The controller 70 controls the rotational speed of the driving motor 60, via the TMG driver 61, according to the amount of depression of an accelerator pedal detected by the accelerator sensor 54. The controller 70 also controls the rotational speed of the ACP motor 81, via the ACPMG driver 82, according to the amount of depression detected by the accelerator sensor 54. Thus, the amount of the oxidation gas 19 supplied to the FC stack 10 is adjusted.

The controller 70 is, for example, is a computer including CPU, ROM, RAM, input and output interfaces, and so forth. For example, when the controller 70 receives a starting signal from the vehicle on which the fuel cell system 1 is installed, it starts operation of the fuel cell system 1. Then, during operation, the controller 70 obtains power commensurate with a load demand on the fuel cell system 1, based on a signal of the accelerator sensor 54 from the accelerator pedal, a sensor signal from the brake pedal, a sensor signal from a velocity sensor of the vehicle, and so forth. For example, when a high load demand is made on the FC stack 10, the controller 70 causes the FC stack 10 to deliver power commensurate with the high load demand, via the FC boost converter 30. The controller 70 determines the proportion of power delivered by the FC stack 10 and power delivered by the battery 20. The controller 70 controls the ACP motor 81 and the air compressor 80, via the ACPMG driver 82, so that the electric power generated by the FC stack 10 coincides with the power thus determined. In this manner, the supply amounts of the fuel gas 18 and the oxidation gas 19 are controlled.

Next, refreshing operation will be explained as operation of the fuel cell system 1. For example, during normal operation of the vehicle, or the like, on which the fuel cell system 1 is installed, the fuel cell system 1 is also normally operated. The range of the stack voltage Vs during normal operation is between 0.7V and 1.0V, for example. If the fuel cell system 1 is kept operating with the stack voltage Vs kept in this range, an oxide layer is formed on a surface of platinum contained in the electrode catalyst 17 of the FC stack 10, and the effective area of the platinum catalyst is reduced. As a result, the performance of the electrode catalyst 17 and the power generation performance of the FC stack 10 are degraded.

Thus, the controller 70 performs refresh control on the electrode catalyst 17 of the FC stack 10. Namely, the controller 70 reduces the stack voltage Vs to a voltage at which the electrode catalyst 17 of the FC stack 10 is activated. More specifically, the controller 70 reduces the stack voltage Vs to a voltage at which the surface of the electrode catalyst 17 is reduced, so that the oxide layer of the electrode catalyst 17 is removed. The stack voltage Vs at which the surface of the electrode catalyst 17 is reduced, and the electrode catalyst 17 is activated, will be referred to as "refresh voltage Vr".

Figure 3:
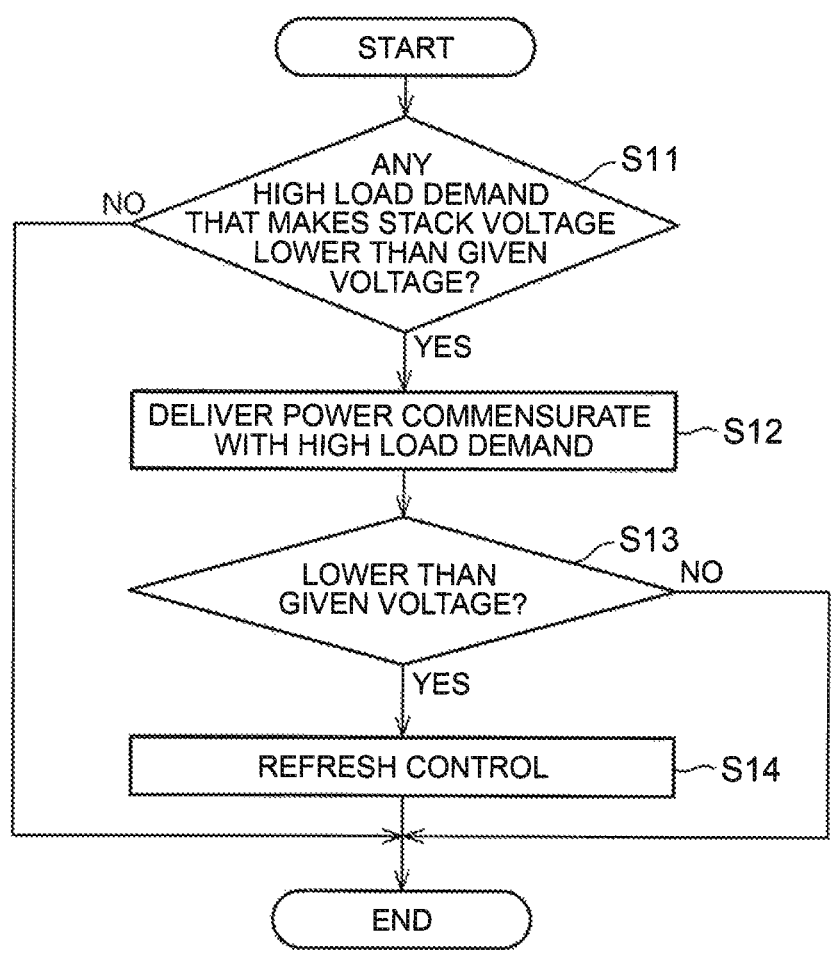
FIG. 3 is a flowchart illustrating the outline of refreshing operation according to the embodiment.

Initially, the refreshing operation according to this embodiment will be generally described. After the operation is generally described, details of the refreshing operation will be described. FIG. 3 is a flowchart illustrating the outline of the refreshing operation according to the embodiment. In the refreshing operation, the controller 70 performs refresh control, if certain conditions as indicated below are satisfied.

As shown in step S11 of FIG. 3, the controller 70 determines whether there is a high load demand that makes the stack voltage Vs lower than a given voltage. The given voltage is, for example, a determination voltage Vt. In order to derive the given voltage and the determination voltage Vt, the voltage frequency Hv and the amount of degradation of the electrode catalyst 17 will be initially explained, and then, the given voltage and the determination voltage Vt will be explained. Initially, the voltage frequency Hv will be described.

Figure 4:
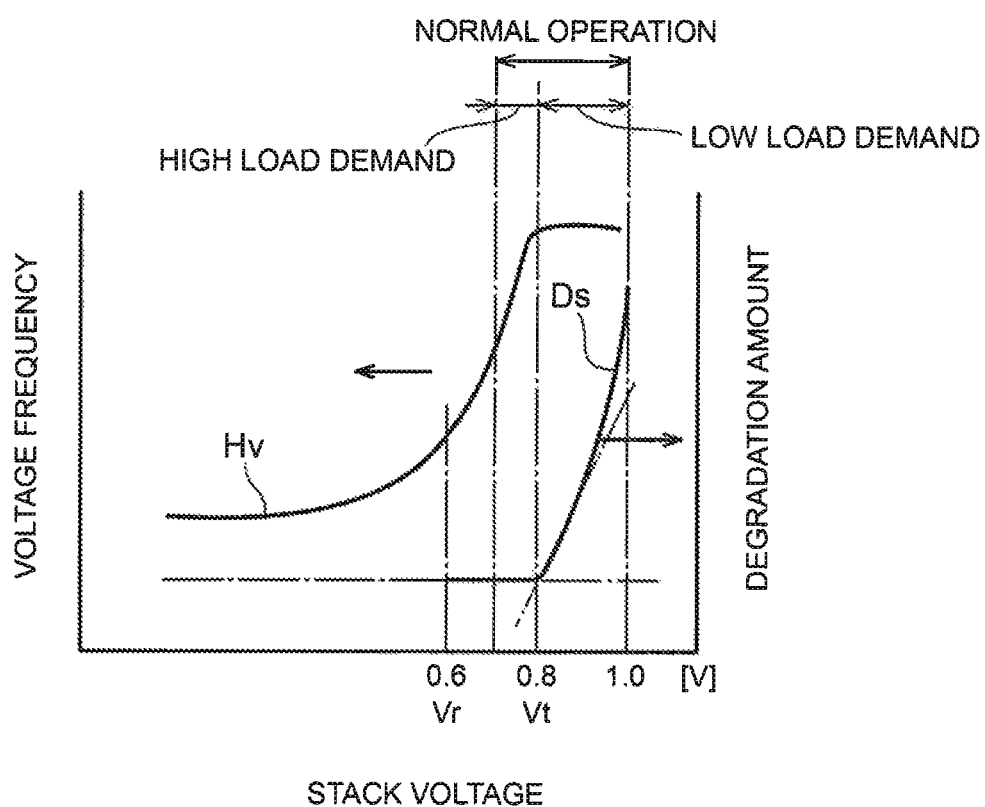
FIG. 4 is a graph showing a determination voltage according to the embodiment, in which the horizontal axis indicates stack voltage, and the left-hand vertical axis indicates voltage frequency, while the right-hand vertical axis indicates the amount of degradation.

FIG. 4 is a graph indicating the determination voltage Vt according to the embodiment. In FIG. 4, the horizontal axis indicates the stack voltage Vs, and the left-side vertical axis indicates the voltage frequency Hv, while the right-side vertical axis indicates the degradation amount Ds.

The voltage frequency Hv is the frequency of the stack voltage Vs indicated by the FC stack 10 during operation of the FC stack 10. For example, when the stack voltage Vs indicated by the FC stack 10 is measured at fixed intervals, the voltage frequency Hv is the number of times the FC stack 10 indicates each stack voltage Vs.

As shown in FIG. 4, the voltage frequency Hv assumes high values, during normal operation of the FC stack 10 and the vehicle, or the like, on which the FC stack 10 is installed. For example, the stack voltage Vs during normal operation of the FC stack 10 is within the range of 0.7V to 1.0V, and the voltage frequency Hv assumes high values in this range.

The stack voltage Vs during normal operation is, for example, the stack voltage Vs in the case where the vehicle, or the like, on which the fuel cell system 1 is installed is normally traveling, for example. The normal traveling means traveling of the vehicle from a certain point to another point on the ground, in accordance with traffic regulations.

When the voltage frequency Hv of each stack voltage Vs indicated by the FC stack 10 during operation of the FC stack 10 is standardized with the maximum value of the voltage frequency Hv, the value of the voltage frequency Hv during normal operation is equal to or larger than 0.8, for example. It is, however, to be noted that the voltage frequency during normal operation varies depending on the type of vehicle on which the FC stack 10 is installed, and its driving situation. The voltage frequency Hv at which the FC stack 10 indicates a stack voltage Vs lower than 0.7V is rapidly reduced. The voltage frequency Hv at which the FC stack 10 indicates a stack voltage Vs lower than 0.6V assumes a low value.

Next, the amount of degradation of the electrode catalyst 17 will be explained. The oxide layer formed on the surface of the electrode catalyst 17 has been described above in connection with the performance of the electrode catalyst 17, and the electrode catalyst 17 can be activated through refresh control. Apart from the oxide layer, the performance of the electrode catalyst 17 may also be deteriorated due to reduction of the surface area caused by coarsening of particles of the electrode catalyst 17, and degradation due to melting of platinum, for example. One of the reasons for degradation of the electrode catalyst 17 is voltage change under the refresh control.

The graph of the degradation amount Ds shown in FIG. 4 shows the relationship between the stack voltage Vs at which the refresh control is started, and the amount of degradation of the electrode catalyst 17 when the refresh control is performed. Namely, the graph of the degradation amount Ds is plotted with the horizontal axis indicating the stack voltage Vs when the refresh control is started, and the vertical axis indicating the degradation amount Ds of the electrode catalyst 17 when the refresh control is performed at the stack voltage Vs.

The degradation amount Ds increases as the stack voltage Vs at the time when the refresh control is started is higher. When the stack voltage Vs at which the refresh control is started is high, a voltage change by which the stack voltage Vs is reduced down to the refresh voltage Vr is large, which is considered to increase the degradation amount of the electrode catalyst 17. On the other hand, when the stack voltage Vs at which the refresh control is started is low, a voltage change by which the stack voltage Vs is reduced down to the refresh voltage Vr is small, which is considered to reduce the degradation amount of the electrode catalyst 17.

Next, the given voltage will be described. For example, one stack voltage Vs in the range of stack voltage Vs during normal operation is set to the given voltage. In this case, the degradation amount obtained when the refresh control was performed at a stack voltage Vs that is equal to or higher than the given voltage is equal to or larger than the degradation amount obtained when the refresh control was performed at a stack voltage Vs that is lower than the given voltage. The given voltage is preferably selected from the range of stack voltage Vs during normal operation. The given voltage is preferably a low-voltage-side stack voltage Vs, within the range of stack voltage Vs during normal operation. In this manner, the degradation amount can be reduced. The given voltage is preferably selected in view of the voltage frequency Hv and the frequency of refresh control.

Next, the determination voltage Vt will be described. The degradation amount Ds rapidly increases on the high voltage side, from a certain stack voltage Vs as a limit. If the degradation amount at the refresh voltage Vr is subtracted as a base from the degradation amount Ds, it is found that degradation of the electrode catalyst 17 occurs under refresh control performed at or above the above-indicated certain stack voltage Vs. Thus, the stack voltage Vs at the limit from which the degradation amount Ds rapidly increases will be called "determination voltage Vt".

Accordingly, the determination voltage Vt is selected, such that the degradation amount Ds of refresh control involving a potential change over the determination voltage Vt becomes larger than the degradation amount Ds of refresh control involving a potential change that does not pass over the determination voltage Vt.

More specifically, the stack voltage Vs during normal operation is within the range of 0.7V to 1.0V, for example, and the degradation amount Ds is rapidly increased in the case where the stack voltage Vs at which the refresh control is started is 0.8V is higher, when the refresh voltage Vr is 0.6V, for example. When the stack voltage Vs is equal to or higher than 0.8V, degradation of the electrode catalyst 17 occurs. On the other hand, when the stack voltage Vs at which the refresh control is started is smaller than 0.8V, the degradation amount Ds is reduced. Thus, 0.8V, for example, is selected as the determination voltage Vt. It is, however, to be noted that the determination voltage Vt is not limited to 0.8V, but may vary depending on various conditions.

When 0.8V, for example, is selected as the determination voltage Vt, and the refresh control is performed at the stack voltage Vs=1.0V, the stack voltage Vs changes from 1.0V to 0.6V. Accordingly, the refresh control involves a potential change over the determination voltage Vt, and the degradation amount Ds of the electrode catalyst 17 is increased.

On the other hand, when the refresh control is performed at the stack voltage Vs=0.7V, which is lower than 0.8V, the stack voltage Vs changes from 0.7V to 0.6V. Thus, the refresh voltage does not involve any potential change over the determination voltage Vt, and the degradation amount Ds of the electrode catalyst 17 is small.

Next, the high load demand and low load demand during normal operation will be described. A load demand that makes the stack voltage Vs lower than the given voltage will be called "high load demand", and a load demand that makes the stack voltage Vs equal to or higher than the given voltage will be called "low load demand". Then, the range of the stack voltage Vs during normal operation can be divided into a low voltage range indicating a high load demand, and a high voltage range indicating a low load demand.

More specifically, the given voltage, as the determination voltage Vt, is set to 0.8V, for example. It is, however, to be noted that the given voltage is not limited to the determination voltage Vt, and not limited to 0.8V. The given voltage varies depending on various conditions. In the case where the range of the stack voltage Vs during normal operation is equal to or higher than 0.7V and is equal to or lower than 1.0V, and the determination voltage Vt is set to 0.8V, the low-voltage range indicating a high load demand is, for example, equal to or higher than 0.7V and is lower than 0.8V, and the high-voltage range indicating a low load demand is equal to or higher than 0.8V and is equal to or lower than 1.0V.

Here, reduction of the stack voltage Vs in response to a high load demand will be explained. A high load demand is made on the FC stack 10, when the accelerator pedal is depressed, so as to accelerate the vehicle, for example. In this case, the controller 70 causes the FC stack 10 to deliver power commensurate with the high load demand. At this time, the controller 70 performs current sweep, namely, draws electric current from the FC stack 10, so as to pass current through the driving motor 60. The controller 70 passes current through the driving motor 60, and also controls the FC stack 10 so as to keep the power of the FC stack 10 constant. Accordingly, when the current of the FC stack 10 is swept up, the stack voltage Vs of the FC stack 10 is reduced.

As indicated in FIG. 4 showing the degradation amount, the reduction of the surface area due to coarsening of particles of the electrode catalyst 17, and degradation due to melting of platinum, for example, are considered to occur due to voltage change under the refresh control. In addition, it is found that the degradation of the electrode catalyst 17 also occurs when the stack voltage Vs is simply reduced to be lower than the determination voltage Vt. More specifically, during normal operation, degradation of the electrode catalyst 17 progresses, merely because the stack voltage Vs is reduced from 0.9V to 0.7V that is lower than the determination voltage Vt, in response to a high load demand, for example.

Referring back to FIG. 3, as indicated in step S11, the controller 70 determines whether a high load demand, which makes the stack voltage Vs lower than the given voltage, is made on the FC stack 10, for example. The given voltage is, for example, the determination voltage Vt. The high load demand is, for example, a demand for current sweep. If it is determined that there is no high load demand that makes the stack voltage Vs lower than the given voltage (if a negative decision (NO) is obtained in step S11), (the) refreshing operation is finished. For example, operation to defer refresh control until the next refresh operation is determined is performed.

On the other hand, if the controller 70 determines that a high load demand that makes the stack voltage Vs lower than the given voltage is made on the FC stack 10 (if an affirmative decision (YES) is obtained in step S11), the controller 70 causes the FC stack 10 to deliver power commensurate with the high load demand, as indicated in step S12 of FIG. 3. Then, as indicated in step S13 of FIG. 3, it is determined whether the stack voltage Vs has been reduced to be lower than the given voltage, through this control. If the stack voltage Vs is not reduced to be lower than the given voltage (if a negative decision (NO) is obtained in step S13), the refreshing operation is finished. On the other hand, if the stack voltage Vs is reduced to be lower than the given voltage (if an affirmative decision (YES) is obtained in step S13), the controller 70 performs refresh control, as indicated in step S14 of FIG. 3.

In this manner, the oxide layer on the electrode catalyst 17 is reduced, and the oxide layer can be removed from the surface of the electrode catalyst 17. Thus, the electrode catalyst 17 can be activated.

Also, since the stack voltage Vs at which the refresh control is started can be reduced to be lower than the given voltage, the amount of degradation of the electrode catalyst 17 can be reduced.

Further, when the given voltage is set to the determination voltage Vt, the refresh control can be performed at the stack voltage Vs that is lower than the determination voltage Vt, without causing any voltage change over the determination voltage Vt. Thus, while it is originally necessary to bring about a voltage change over the determination voltage Vt in response to a high load demand, and a voltage change over the determination voltage Vt under the refresh control, the refresh control is performed, taking advantage of the voltage change over the determination voltage Vt in response to the high load demand. Therefore, there is no need to change voltage over the determination voltage Vt, solely for the sake of refresh control. Accordingly, the number of times the voltage changes over the determination voltage Vt can be reduced. Consequently, the amount of degradation of the electrode catalyst 17 can be reduced.

Figure 5:
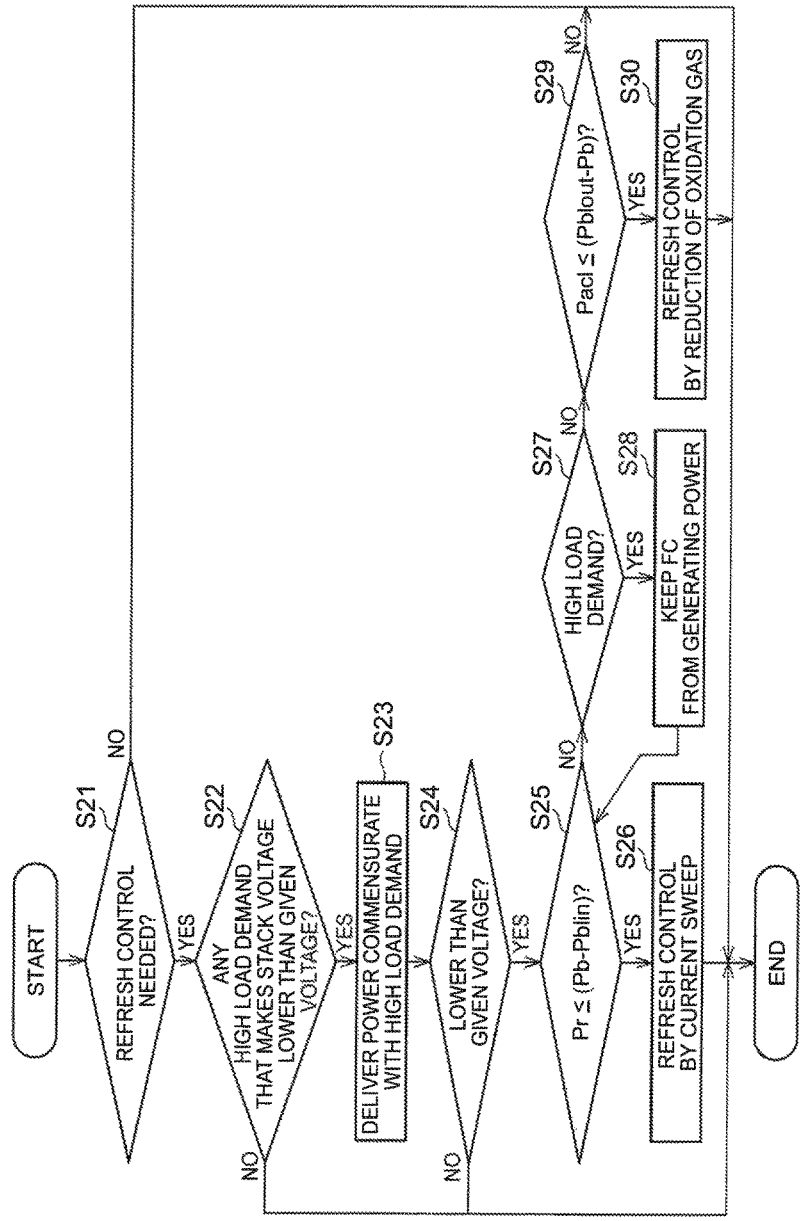
FIG. 5 is a flowchart illustrating details of the refreshing operation according to the embodiment.

Next, details of the refreshing operation of this embodiment will be described in detail. FIG. 5 is a flowchart illustrating details of the refreshing operation according to this embodiment.

As indicated in step S21 of FIG. 5, the controller 70 initially determines whether refresh control of the electrode catalyst 17 needs to be performed. For example, it is determined whether the amount of the oxide layer formed on the surface of the electrode catalyst 17 is equal to or larger than a predetermined amount. For example, this determination is made by guessing the amount of the oxide layer from a length of time that has elapsed since the last refresh control was performed, or the amount of the load on the FC stack 10, for example.

If the refresh control of the electrode catalyst 17 is not needed (if a negative decision (NO) is obtained in step S21), the controller 70 finishes the refreshing operation. For example, if the amount of the oxide layer formed on the surface of the electrode catalyst 17 is equal to or smaller than the predetermined amount, and it is determined that the refresh control is not needed, the controller 70 finishes the refreshing operation.

On the other hand, if the refresh control of the electrode catalyst 17 needs to be performed (if an affirmative decision (YES) is obtained in step S21), for example, if the amount of the oxide layer formed on the surface of the electrode catalyst 17 exceeds the predetermined amount, and the refresh control is needed, it is determined whether a high load demand that makes the stack voltage Vs lower than the given voltage is generated, as indicated in step S22 of FIG. 5. The determination as to whether a high load demand is generated in step S22, output of the power commensurate with the high load demand in step S23, and the determination made by comparing the stack voltage Vs with the given voltage in step S24 have been explained above referring to FIG. 3; therefore, the explanation will be omitted. When the stack voltage Vs becomes lower than the given voltage, the refresh control is carried out according to the flow as follows.

As indicated in step S25 of FIG. 5, it is determined whether the refresh generated power Pr is equal to or smaller than a difference (Pb-Pblin) between the battery current power Pb and the battery maximum charge permissible power Pblin, namely, whether the following expression (1) is satisfied.

$$Pr \leq (Pb - Pblin) \tag{1}$$

Here, the refresh generated power Pr is electric power generated under the refresh control. For example, when the refresh control using current sweep is performed, power is generated from the FC stack 10. The battery current power Pb is the current power of the battery 20. The battery maximum charge permissible power Pblin is the maximum power with which the battery 20 can be charged. The above expression (1) indicates that the power generated under the refresh control using current sweep is equal to or smaller than the power with which the battery 20 can be charged. In the following, the relationship among the refresh generated power Pr, battery current power Pb, and the battery charge permissible power Pblin will be described.

Figure 6:
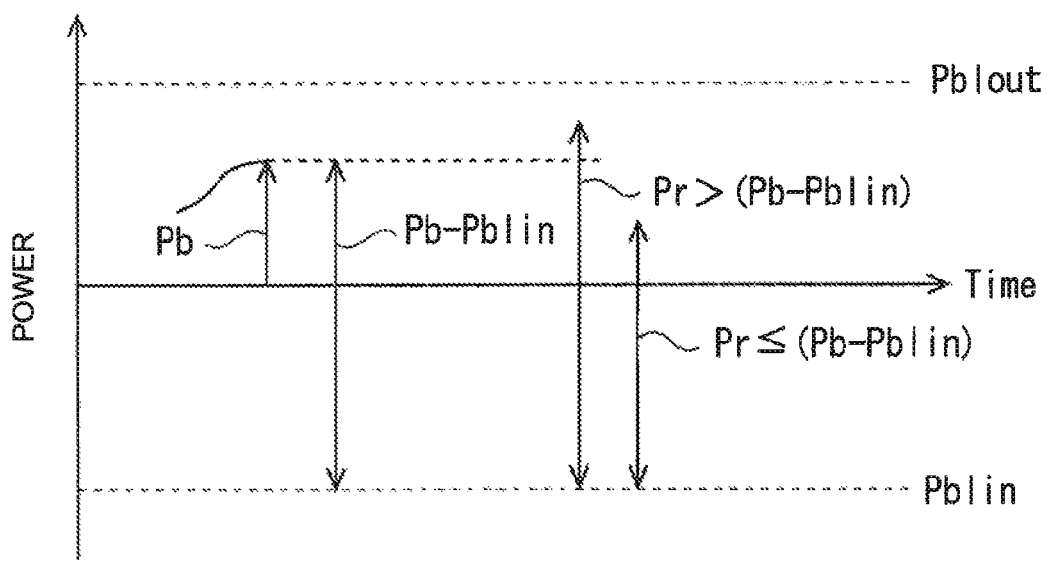
FIG. 6 is a graph showing refresh generated power, battery current power, buttery maximum charge permissible power, and battery maximum discharge permissible power, according to the embodiment, in which the horizontal axis indicates time, and the vertical axis indicates power of the battery, while the negative side of the vertical axis indicates the charge amount, and the positive side of the vertical axis indicates the discharge amount.

FIG. 6 is a graph showing the refresh generated power Pr, battery current power Pb, battery maximum charge permissible power Pblin, and the battery maximum discharge permissible power Pblout, according to this embodiment. In FIG. 6, the horizontal axis indicates time, and the vertical axis indicates power of the battery, while the negative side of the vertical axis indicates the charge amount, and the positive side of the vertical axis indicates the discharge amount.

Suppose that at a certain point in time, the battery current power Pb is located on the positive side in relation to the vertical axis, as shown in FIG. 6. When the battery current power Pb is on the positive side in relation to the vertical axis, the battery 20 is in an operating state in which it discharges power to the fuel cell system 1. The battery maximum discharge permissible power Pblout is the maximum power permitted by the controller 70 to be discharged from the battery 20. The battery maximum discharge permissible power Pblout is dependent on the temperature, and is limited by the controller 70, particularly at relatively high temperatures and relatively low temperatures.

On the other hand, the battery maximum charge permissible power Pblin is the maximum power permitted by the controller 70 to be used for charging the battery 20. The battery maximum charge permissible power Pblin is dependent on the temperature, and is limited by the controller 70, particularly at relatively high temperatures and relatively low temperatures.

When the battery current power Pb is on the positive side in relation to the vertical axis, and the battery 20 is in a power discharging condition, the difference (Pb-Pblin) between the battery current power Pb and the battery maximum charge permissible power Pblin indicates power with which the battery 20 having the battery current power Pb will be able to be charged from now on.

When the refresh generated power Pr is larger than the difference (Pb-Pblin) between the battery current power Pb and the battery maximum charge permissible power Pblin, namely, when the following expression (2) is satisfied, it indicates that the refresh generated power Pr is larger than the power with which the battery 20 can be charged.

$$Pr > (Pb - Pblin) \tag{2}$$

If it is determined in step S25 of FIG. 5 that the refresh generated power Pr is equal to or smaller than the difference (Pb-Pblin) between the battery current power Pb and the battery maximum charge permissible power Pblin, namely, if it is determined that the above expression (1) is satisfied (an affirmative decision (YES) is obtained in step S25), the controller 70 performs the refresh control, as indicated in step S26 of FIG. 5. More specifically, the refresh control is performed through current sweep, before the stack voltage Vs becomes equal to or higher than the determination voltage Vt.

Thus, the refresh control is performed when the battery 20 can be charged with the refresh generated power Pr. In this manner, unintended acceleration of the vehicle can be curbed or prevented. After the refresh control using current sweep, the routine ends.

Figure 7A:
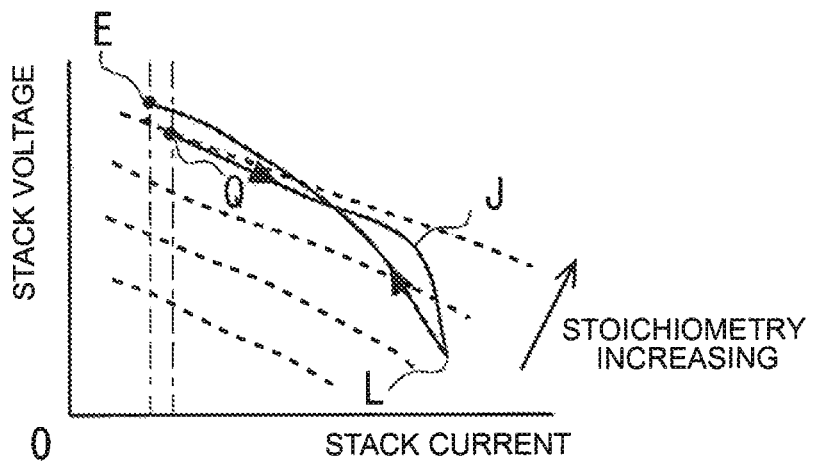
FIG. 7A is a graph showing the relationship among stack current, stack voltage, and stoichiometry, at the time of refresh control using current sweep, in which the horizontal axis indicates the stack current, and the vertical axis indicates the stack voltage.

Here, the refresh control using current sweep will be described. FIG. 7A is a graph showing one example of the relationship among the stack current, stack voltage Vs, and the stoichiometry at the time of refresh control using current sweep. In FIG. 7A, the horizontal axis indicates stack current, and the vertical axis indicates stack voltage Vs.

In the graph shown in FIG. 7A, each curve indicating the same value of stoichiometry is in the form of a downward-sloping curve. As the value of stoichiometry becomes larger, the curve of stoichiometry moves in a direction away from the origin. The stoichiometry is the ratio of the actual amount of oxidation gas 19 to the theoretically required amount of oxidation gas 19. For example, when the amount of oxidation gas 19 is set to 1 in the case where the stack current As is caused to flow by the amount of 1, for example, the stoichiometry is said to be 1. If the oxidation gas 19 is supplied in an amount that is one-and-a-half times as large as the theoretically required amount, the stoichiometry is said to be 1.5.

Generally, if the oxidation gas 19 is supped with the stoichiometry kept at 1, some of the oxidation gas 19 does not contact with the electrode catalyst 17. Accordingly, a larger amount (such as 1.2 or 1.5) of the oxidation gas 19 than 1 is generally supplied, so that sufficient performance can be exhibited. Also, even if an excessive amount (such as 5 or 10 in terms of the stoichiometry) of the oxidation gas 19 is supplied, substantially no change appears in the performance.

As shown in FIG. 7A, under the refresh control using current sweep in this embodiment, the amount of the oxidation gas 19 is kept unchanged, and the stack current As is swept up. Solid line J in FIG. 7A indicates movement of the operating point when the refresh control is performed through current sweep. The operating point starts at a start point Q. The stack voltage Vs at the start point Q is lower than the given voltage, e.g., determination voltage Vt.

The controller 70 controls the FC stack 10 so as to draw the stack current As from the FC stack 10. Namely, the FC stack 10 is controlled so that the operating point moves from the start point Q in a direction in which the stack current As increases. As a result, the operating point moves in a direction in which the stack voltage Vs decreases. Then, the oxidation gas 19 is consumed as the stack current As increases, so that the stoichiometry is reduced. For example, the stoichiometry is reduced from 1 to 0.5. As a result, the stack voltage Vs is reduced, and the operating point moves to the lowest point L. At the lowest point L, the stack voltage Vs becomes equal to the refresh voltage Vr at which the refresh control is performed.

Thus, under the refresh control using current sweep, the stack current As is drawn with the amount of the oxidation gas 19 kept constant; therefore, consumption of the oxidation gas 19 is increased, and the oxide layer of the electrode catalyst 17 is consumed, and removed from the surface of the electrode catalyst 17.

The operating point returns from the lowest point L along an arrow in FIG. 7A, and reaches the end point E. The stack voltage Vs at the end point E is higher than that at the start point Q, and the stack current As at the end point E is smaller than that at the start point Q. The power at the start point Q and the power at the end point E are controlled to be the same power. Thus, before and after the refresh control, the same power can be generated with the stack current As reduced. Thus, through the refresh control, the fuel efficiency of the FC stack 10 can be improved.

The fuel efficiency of the FC stack 10 is calculated from the ratio of the amount of the fuel gas 18 consumed, and the traveling distance. Electric charge produced in a chemical change per mole of hydrogen contained in the fuel gas 18 corresponds to the stack current As. Thus, the stack current As in the FC stack 10 is proportional to the amount of the fuel gas 18 consumed. Accordingly, reduction of the stack current As means improvement of the fuel efficiency.

Figure 7B:
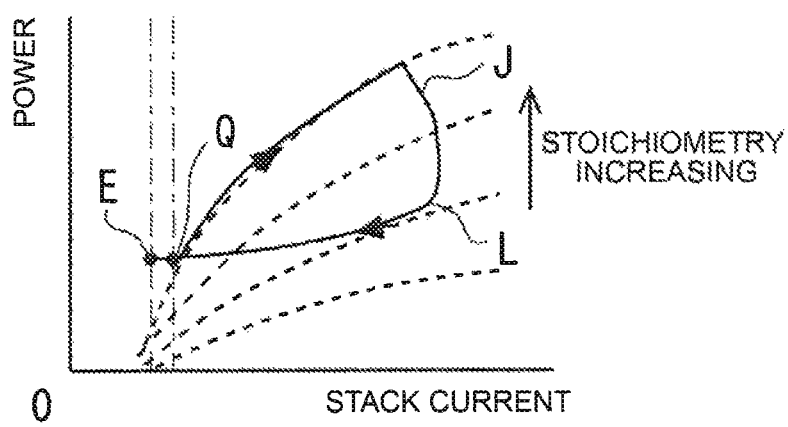
FIG. 7B is a graph showing the relationship among stack current, power, and stoichiometry, at the time of refresh control using current sweep, in which the horizontal axis indicates the stack current, and the vertical axis indicates the power.

FIG. 7B is a graph showing one example of the relationship among the stack current As, power, and the stoichiometry, at the time of refresh control using current sweep. In FIG. 7B, the horizontal axis indicates stack current As, and the vertical axis indicates power. Each curve indicating the same value of stoichiometry is in the form of an upward-sloping curve. As the value of stoichiometry becomes larger, the curve of stoichiometry moves in a direction in which the power increases. FIG. 7B shows movement of the operating point when the vertical axis in FIG. 7A is changed.

In FIG. 7B, solid line J indicates movement of the operating point at the time of refresh control using current sweep. The operating point starts at a start point Q. The controller 70 controls the FC stack 10 so as to draw the stack current As from the FC stack 10. Namely, the FC stack 10 is controlled so that the operating point moves from the start point Q in a direction in which the stack current As and the power increase. Then, the oxidation gas 19 is consumed, so that the stoichiometry is reduced. As a result, the power and the stack voltage Vs are reduced, and the operating point moves to the lowest point L. The stack voltage Vs at the lowest point L is the refresh voltage Vr.

The operating point returns from the lowest point L along an arrow in FIG. 7B, and reaches an end point E. At the end point E, the stack current As is reduced from the start point Q. Also, the power at the start point Q and the power at the end point E are controlled to be the same power. Thus, before and after the refresh control, the same power can be generated with the stack current As reduced, which indicates that the fuel efficiency of the FC stack 10 is improved.

Figure 7C:
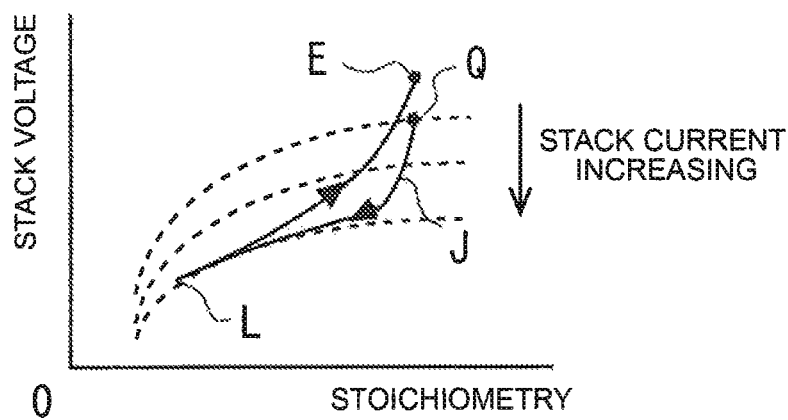
FIG. 7C is a graph showing the relationship among stoichiometry, stack voltage, and stack current, at the time of refresh control using current sweep, in which the horizontal axis indicates the stoichiometry, and the vertical axis indicates the stack voltage.

FIG. 7C is a graph showing one example of the relationship among the stoichiometry, stack voltage Vs, and the stack current As, at the time of refresh control using current sweep. In FIG. 7C, the horizontal axis indicates the stoichiometry, and the vertical axis indicates the stack voltage Vs. Each curve indicating the same value of stack current As is in the form of an upward-sloping curve. As the value of the stack current As becomes larger, the curve of the stack current As moves in a direction in which the stack voltage Vs decreases. FIG. 7C shows movement of the operating point when the horizontal axis in FIG. 7A is changed.

In FIG. 7C, solid line J indicates movement of the operating point when refresh control is performed through current sweep. The operating point starts at a start point Q. The controller 70 controls the FC stack 10 so that the stack current As is drawn from the FC stack 10. Then, the oxidation gas 19 is consumed, so that the stoichiometry is reduced. As a result, the stack voltage Vs is reduced, and the operating point moves to the lowest point L. The stack voltage Vs at the lowest point L is the refresh voltage Vr.

The operating point returns from the lowest point L along an arrow in FIG. 7C, and reaches an end point E. The stack current As at the end point E is smaller than that at the start point Q. Also, the power at the start point Q and the power at the end point E are controlled to be the same power. Thus, before and after the refresh control, the same power can be generated with the stack current As thus reduced, which indicates improvement of the fuel efficiency of the FC stack 10. In this manner, the controller 70 performs refresh control through current sweep.

Referring back to FIG. 5, if it is determined in step S25 of FIG. 5 that the refresh generated power Pr is larger than the difference (Pb-Pblin) between the battery current power Pb and the battery maximum charge permissible power Pblin (if a negative decision (NO) is obtained in step S25), the controller 70 determines whether a high load demand, such as acceleration of the vehicle, is made on the FC stack 10, as indicated in step S27 of FIG. 5. The high load demand, such as acceleration of the vehicle, is made when the accelerator pedal is depressed, and the vehicle is accelerated, for example.

If the controller 70 determines that a high load demand, such as acceleration of the vehicle, is made on the FC stack 10 (if an affirmative decision (YES) is obtained in step S27), the controller 70 keeps the FC stack 10 from generating electric power, as indicated in step S28 of FIG. 5. Namely, power generation by the FC stack 10 is curbed or inhibited. Then, the controller 70 causes the battery 20 to deliver power according to the high load demand.

Figure 8:
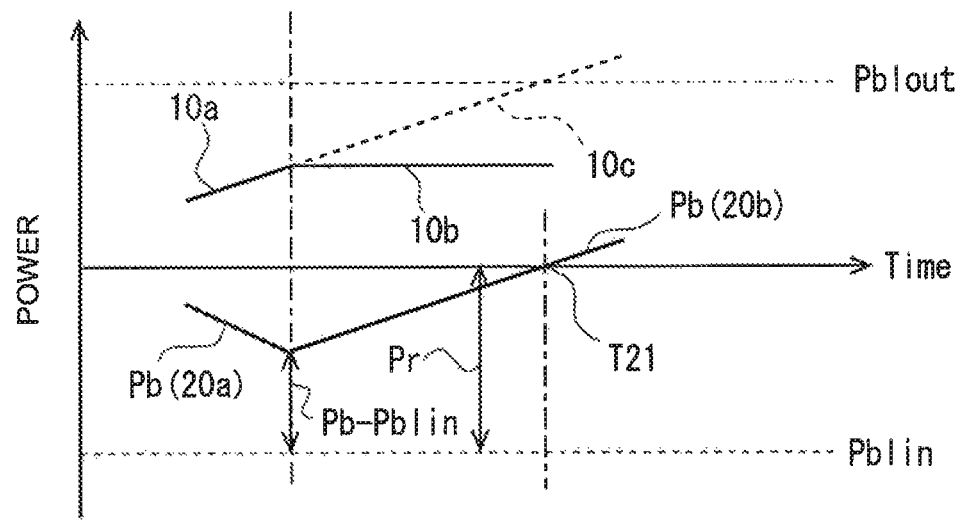
FIG. 8 is a graph showing refresh generated power, battery current power, battery maximum charge permissible power, and battery maximum discharge permissible power, according to the embodiment, in which the horizontal axis indicates time, and the vertical axis indicates power of the battery, while the negative side of the vertical axis indicates charge, and the positive side of the vertical axis indicates discharge.

FIG. 8 is a graph showing the refresh generated power Pr, battery current power Pb, battery maximum charge permissible power Pblin, and the battery maximum discharge permissible power Pblout according to the embodiment. In FIG. 8, the horizontal axis indicates time, and the vertical axis indicates power of the battery 20, while the negative side of the vertical axis indicates the charge amount, and the positive side of the vertical axis indicates the discharge amount. FIG. 8 also shows power of the FC stack 10.

Suppose that at a certain point in time, for example, the battery current power Pb is located on the negative side in relation to the vertical axis, as shown in FIG. 8. When the battery current power Pb is on the negative side in relation to the vertical axis, the battery 20 is in an operating state in which it is charged with power from the FC stack 10, etc. The battery 20 can be charged with power from the FC stack 10, etc., until the charge power reaches the battery maximum charge permissible power Pblin. Then, the refresh generated power Pr is larger than a difference (Pb-Pblin) between the battery current power Pb and the battery maximum charge permissible power Pblin. Namely, FIG. 8 shows a condition where the controller 70 proceeds from step S25 of FIG. 5 to step S27 and step S28.

In this case, if the FC stack 10 is kept from generating electric power, and power generation of the FC stack 10 is curbed or inhibited, in step S28 of FIG. 5, power (power 10$a$ of FIG. 8) of the FC stack 10 becomes constant (power 10$b$ of FIG. 8). If the FC stack 10 is not kept from generating power, the power of the FC stack 10 increases from the power 10$a$ to the power 10$c$, according to the high load demand.

On the other hand, instead of keeping the FC stack 10 from generating power, the controller 70 causes the battery 20 to deliver power commensurate with the high load demand, so as to meet the high load demand made on the FC stack 10. As a result, as shown in FIG. 8, the battery current power Pb shifts from the battery current power Pb (20$a$) to the battery current power Pb (20$b$).

Next, referring back to FIG. 5, in step S25, it is determined again whether the above expression (1) is satisfied, namely, whether the refresh generated power Pr is equal to or smaller than the difference (Pb–Pblin) between the battery current power Pb and the battery maximum charge permissible power Pblin. If the expression (1) is satisfied (if an affirmative decision (YES) is obtained in step S25), the refresh control using current sweep is performed, as indicated in step S26.

On the other hand, if the controller 70 determines again in step S25 of FIG. 5 that the refresh generated power Pr is larger than the difference (Pb–Pblin) between the battery current power Pb and the battery maximum charge permissible power Pblin (if a negative decision (NO) is obtained in step S25), the controller 70 determines whether the high load demand continues to be made on the FC stack 10, as indicated in step S27 of FIG. 5. If the high load demand continues to be made on the FC stack 10 (if an affirmative decision (YES) is obtained in step S27), the FC stack 10 continues to be kept from generating electric power.

Then, as shown in FIG. 8, the battery current power Pb moves to the positive side. Accordingly, at time T21, the controller 70 determines in step S25 that the above expression (1) is satisfied, namely, the refresh generated power Pr is larger than the difference (Pb–Pblin) between the battery current power Pb and the battery maximum charge permissible power Pblin. If an affirmative decision (YES) is thus obtained in step S25, the controller 70 performs refresh control through current sweep, as indicated in step S26 of FIG. 5.

On the other hand, if the refresh generated power Pr is still larger than the difference (Pb-Pblin) between the battery current power Pb and the battery maximum charge permissible power Pblin, namely, the above expression (2) is satisfied (a negative decision (NO) is obtained) in step S25 of FIG. 5, and no high load demand is made on the FC stack 10 (a negative decision (NO) is obtained) in step S27 of FIG. 5, the controller 70 determines whether the following expression (3) is satisfied, as indicated in step S29 of FIG. 5. Namely, it is determined whether re-acceleration required power Pad as power required to meet a high load demand, in preparation for re-generation of the high load demand, is equal to or smaller than a difference (Pblout-Pb) between the battery maximum discharge permissible power Pblout, and the battery current power Pb.

$$Pacl \leq (Pblout - Pb) \qquad (3)$$

The above expression (3) represents the case where power commensurate with another high load demand, such as re-acceleration, if any, is equal to or smaller than the power that can be delivered by the battery 20.

Figure 9:
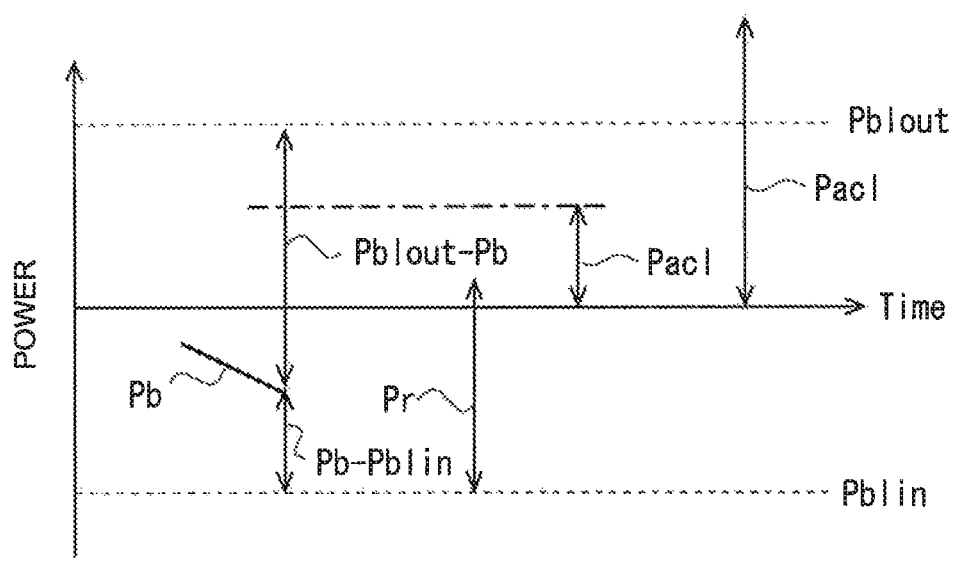
FIG. 9 is a graph showing re-acceleration required power, battery current power, battery maximum charge permissible power, and battery maximum discharge permissible power, according to the embodiment, in which the horizontal axis indicates time, and the vertical axis indicates power of the battery, while the negative side of the vertical axis indicates charge, and the positive side of the vertical axis indicates discharge.

FIG. 9 is a graph showing the re-acceleration required power Pacl, battery current power Pb, battery maximum charge permissible power Pblin, and the battery maximum discharge permissible power Pblout, according to this embodiment. In FIG. 9, the horizontal axis indicates time, and the vertical axis indicates power, while the negative side of the vertical axis indicates the charge amount, and the positive side of the vertical axis indicates the discharge amount.

Suppose that at a certain point in time, for example, the battery current power Pb is located on the negative side in relation to the vertical axis, as shown in FIG. 9. When the battery current power Pb is on the negative side in relation to the vertical axis, the battery 20 is in a condition where it is charged with power from the FC stack 10, etc. The battery 20 can be charged with power from the FC stack 10, etc., until the power reaches the battery maximum charge permissible power Pblin. Then, the refresh generated power Pr is larger than the difference (Pb-Pblin) between the battery current power Pb and the battery maximum charge permissible power Pblin. The battery 20 is also in a condition where it can deliver power to the fuel cell system 1, until the output power reaches the battery maximum discharge permissible power Pblout. Namely, FIG. 9 shows a condition where the controller 70 proceeds from step S25 of FIG. 5 to step S27 and step S29.

In this case, in step S29 of FIG. 5, if the re-acceleration required power Pacl is larger than a difference (Pblout–Pb) between the battery maximum discharge permissible power Pblout, and the battery current power Pb, namely, if the following expression (4) is satisfied (if a negative decision (NO) is obtained in step S29), the controller 70 finishes the refreshing operation.

$$Pacl > (Pblout - Pb) \qquad (4)$$

On the other hand, if the re-acceleration required power Pacl is equal to or smaller than the difference (Pblout–Pb) between the battery maximum discharge permissible power Pblout and the battery current power Pb, namely, if the above expression (3) is satisfied (if an affirmative decision (YES) is obtained in step S29), refresh control is performed by reducing the oxidation gas, as indicated in step S30 of FIG. 5.

Through the refresh control using reduction of the oxidation gas, it is possible to reduce the oxide layer on the electrode catalyst 17, and remove the oxide layer from the surface of the electrode catalyst 17. Thus, the electrode catalyst 17 can be activated.

Also, the refresh control can be performed at a stack voltage Vs that is lower than the given voltage, so that the amount of degradation of the electrode catalyst 17 can be reduced. Also, the refresh control can be performed without involving any voltage change over the determination voltage Vt, so that the amount of degradation of the electrode catalyst 17 can be reduced. These features of the refresh control are similar to those of the refresh control using current sweep.

Further, the refresh control is performed when the battery 20 is able to deliver the re-acceleration required power Pacl; therefore, even when a high load demand is generated again, the battery 20 can deliver the re-acceleration required power Pacl. Thus, insufficient acceleration of the vehicle is less likely or unlikely to occur. After the refresh control is performed by reducing the oxidation gas, the routine of FIG. 5 ends.

Figure 10A:
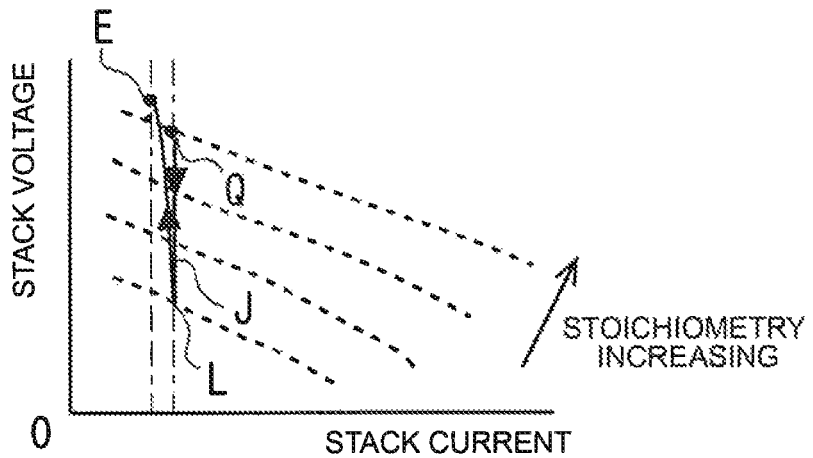
FIG. 10A is a graph showing the relationship among stack current, stack voltage, and stoichiometry, at the time of refresh control performed by reducing oxidation gas, in which the horizontal axis indicates stack current, and the vertical axis indicates stack voltage.

Here, the refresh control performed by reducing oxidation gas will be described. FIG. 10A is a graph showing one example of the relationship among the stack current As, stack voltage Vs, and the stoichiometry, at the time of refresh control performed by reducing oxidation gas. In FIG. 10A, the horizontal axis indicates the stack current As, and the vertical axis indicates the stack voltage Vs.

As shown in FIG. 10A, each curve indicating the same value of stoichiometry is in the form of a downward-sloping curve. As the value of the stoichiometry becomes larger, the curve of the stoichiometry moves in a direction away from the origin. Under the refresh control of this embodiment performed by reducing the oxidation gas 19, the amount of the oxidation gas 19 is reduced with the stack current As kept constant.

In FIG. 10A, solid line J indicates movement of the operating point at the time when refresh control is performed by reducing the oxidation gas 19. The operating point starts at a start point Q. The stack voltage Vs at the start point Q is lower than a given voltage, e.g., the determination voltage Vt. The controller 70 reduces the amount of the oxidation gas 19 while keeping the stack current As constant. For example, the controller 70 controls the air compressor 80, so as to reduce the amount of the oxidation gas 19. As a result, the stoichiometry is reduced. Accordingly, the stack voltage Vs is reduced. Then, the operating point moves to the lowest point L.

The stack voltage Vs at the lowest point L is the refresh voltage Vr. The operating point returns from the lowest point L along an arrow in FIG. 10A, and reaches an end point E. The stack voltage Vs at the end point E is higher than that at the start point Q. Also, the stack current As is reduced. Accordingly, before and after the refresh control, the same power can be delivered with the stack current As reduced. Consequently, the fuel efficiency of the FC stack 10 can be improved through the refresh control.

Figure 10B:
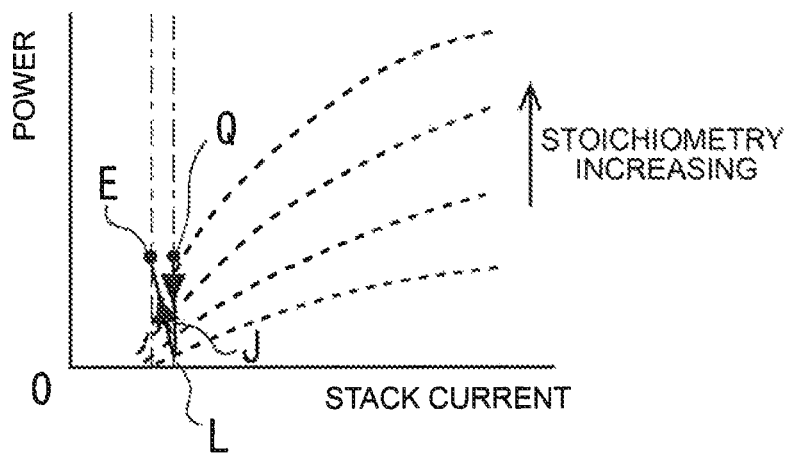
FIG. 10B is a graph showing the relationship among stack current, power, and stoichiometry, at the time of refresh control performed by reducing oxidation gas, in which the horizontal axis indicates stack current, and the vertical axis indicates power.

FIG. 10B is a graph showing one example of the relationship among the stack current As, power, and the stoichiometry, at the time of refresh control performed by reducing the oxidation gas 19. In FIG. 10B, the horizontal axis indicates the stack current As, and the vertical axis indicates the power. Each curve indicating the same value of stoichiometry is in the form of an upward-sloping curve. As the value of the stoichiometry becomes larger, the curve of the stoichiometry moves in a direction in which the power increases. FIG. 10B shows movement of the operating point in the case where the vertical axis in FIG. 10A is changed.

As shown in FIG. 10B, the operating point starts at a start point Q. The controller 70 reduces the oxidation gas 19, while keeping the stack current As constant. Namely, the controller 70 performs control so that the operating point shifts from the start point Q in a direction in which the stoichiometry is reduced with the stack current As kept constant, and in a direction in which the power is reduced. In this manner, the operating point moves to the lowest point L. The stack voltage Vs at the lowest point L is the refresh voltage Vr.

The operating point returns from the lowest point L along an arrow in FIG. 10B, and reaches an end point E. The stack current As at the end point E is smaller than that at the start point Q. Also, the power at the start point Q and the power at the end point E are controlled to be the same power. Thus, before and after the refresh control, the same power can be delivered with the stack current As reduced. Accordingly, the fuel efficiency of the FC stack 10 can be improved through the refresh control.

Figure 10C:
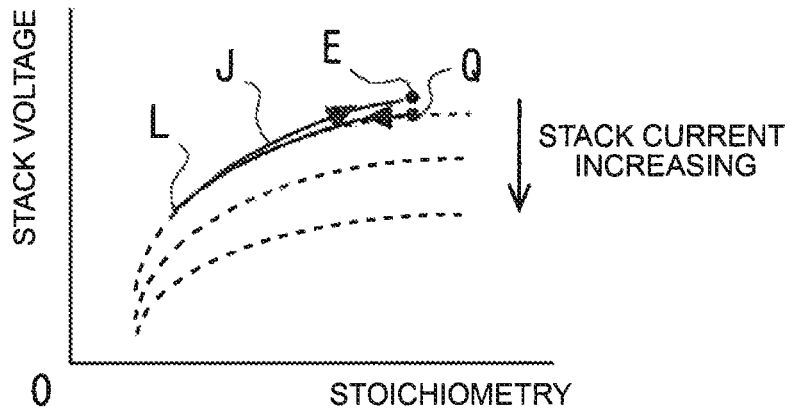
FIG. 10C is a graph showing the relationship among stoichiometry, stack voltage, and stack current, at the time of refresh control performed by reducing oxidation gas, in which the horizontal axis indicates stack current, and the vertical axis indicates stack voltage.

FIG. 10C is a graph showing one example of the relationship among the stoichiometry, stack voltage Vs, and the stack current As, at the time of the refresh control performed by reducing the oxidation gas. In FIG. 10C, the horizontal axis indicates the stoichiometry, and the vertical axis indicates the stack voltage Vs. Each curve indicating the same value of stack current As is in the form of an upward-sloping curve. As the value of the stack current As becomes larger, the curve of the stack current As moves in a direction in which the stack voltage Vs is reduced. FIG. 10C shows movement of the operating point in the case where the horizontal axis in FIG. 10A is changed.

As shown in FIG. 10C, the operating point starts at a start point Q. The controller 70 performs control so as to reduce the amount of the oxidation gas 19 while keeping the stack current As constant. As a result, the stoichiometry is reduced. Accordingly, the stack voltage Vs is reduced. Then, the operating point moves to the lowest point L. The voltage at the lowest point L is the refresh voltage Vr.

The operating point returns from the lowest point L along an arrow in FIG. 10C, and reaches an end point E. The stack current As at the end point E is smaller than that at the start point Q. Also, the power at the start point Q and the power at the end point E are controlled to be the same power. Thus, before and after the refresh control, the same power can be delivered with the stack current As reduced. Accordingly, the fuel efficiency of the FC stack 10 can be improved through the refresh control. After the refresh control performed by reducing the oxidation gas 19 is completed, the refreshing operation ends.

Next, the effects of this embodiment will be described. In the fuel cell system 1 of this embodiment, when a high load demand, which makes the stack voltage Vs lower than the given voltage, is generated, power commensurate with the high load demand is delivered to the FC stack 10, and refresh control is performed when the stack voltage Vs becomes lower than the given voltage through the above control. Accordingly, the refresh control is performed, taking advantage of the time when the stack voltage Vs is reduced. Namely, refresh control is less likely or unlikely to be performed at a high stack voltage Vs at the time of a low load demand, within the range of stack voltage Vs during normal operation, and the refresh control is performed at a low stack voltage Vs at the time of a high load demand. Therefore, the stack voltage Vs at which the refresh control is started can be reduced. Accordingly, the width of voltage change with respect to the refresh voltage Vr at which the refresh control is performed can be reduced. If the width of potential change of the stack voltage Vs is large, degradation due to coarsening of particles of the electrode catalyst 17 and reduction of the surface area, and degradation due to melting of platinum occur. As in this embodiment, the width of voltage change with respect to the refresh voltage Vr at which the refresh control is performed can be reduced, so that degradation of the electrode catalyst 17 can be curbed.

Also, through the refresh control, the oxide layer can be removed from the surface of the electrode catalyst 17, and the electrode catalyst 17 can be activated. It is thus possible to activate the electrode catalyst 17, while curbing degradation of the electrode catalyst 17. Further, the power generation efficiency can be improved, and the fuel efficiency can be improved.

Also, in this embodiment, the refresh control is performed, taking advantage of the time when the stack voltage Vs becomes lower than the determination voltage Vt, so that the number of times the stack voltage Vs crosses the determination voltage Vt (e.g., about 0.8V) at which degradation of the electrode catalyst 17 occurs can be reduced. The degradation of the electrode catalyst 17 occurs, due to not only voltage change under the refresh control, but also simple reduction of the stack voltage Vs over the determination voltage Vt to be lower than the determination voltage Vt. Thus, since the number of times the stack voltage Vs crosses the determination voltage Vt can be reduced, degradation of the electrode catalyst 17 can be curbed.

If the refresh control is performed irrespective of whether the stack voltage Vs is a high voltage or a low voltage, when the refresh control of the electrode catalyst 17 needs to be performed, like the refresh control of the related art, the electrode catalyst 17 can be activated. However, in this case, the stack voltage Vs crosses the determination voltage Vt when the refresh control is performed. In the meantime, even during normal operation, the stack voltage Vs may cross the determination voltage Vt at the time of a high load demand, for example. Accordingly, the number of times the stack voltage Vs crosses the determination voltage Vt is the sum of that at the time of refresh control and that at the time of high load request. Thus, as the number of times the stack voltage Vs crosses the determination voltage Vt of the electrode catalyst 17 increases, degradation due to coarsening of particles of the electrode catalyst 17 and reduction of the surface area, and degradation due to melting of platinum occur. Accordingly, even though voltage change, or reduction of the stack voltage Vs to the determination voltage Vt at which degradation of the electrode catalyst 17 occurs, is repeated, for the sake of activation of the electrode catalyst 17, degradation of the electrode catalyst 17 progresses.

On the other hand, in this embodiment, the refresh control is performed, taking advantage of the time of generation of a high load demand that makes the stack voltage Vs of the FC stack 10 lower than the determination voltage Vt; therefore, the number of times the stack voltage Vs crosses the determination voltage Vt is limited to the occasions when the high load demand is generated. Accordingly, the stack voltage Vs is is prevented from crossing the determination voltage Vt only for the sake of the refresh control. Thus, degradation of the electrode catalyst 17 can be curbed.

In this embodiment, a sufficiently high voltage frequency at which the stack voltage Vs crosses the determination voltage Vt during normal operation is ensured, whereby chances of refresh control can be ensured. Thus, it is possible to curb degradation of the electrode catalyst 17, while sufficiently assuring activation of the electrode catalyst 17.

Also, in this embodiment, the refresh control is performed when the battery 20 can be charged with the power generated under the refresh control. The refresh control requires some room in the charge permissible amount of the battery 20, for receiving the power generated under the refresh control. Otherwise, power that overflows from the battery 20 may affect torque of the motor 60, and may cause unintended acceleration. On the other hand, in this embodiment, refresh control is performed when there is some room in the charge permissible amount of the battery 20, for receiving the power generated under the refresh control; therefore, unintended acceleration can be curbed.

Further, in this embodiment, when the battery 20 cannot be charged with the power generated under the refresh control, the FC stack 10 is kept from generating electric power, and power commensurate with a high load demand is generated from the battery 20. Then, when the delivery of the power from the battery 20 makes it possible for the battery 20 to be charged with the power generated under the refresh control, the refresh control is performed. Thus, refresh control can be performed, by adjusting the permissible charge amount of the battery 20, while meeting the high load demand made on the FC stack 10. It is thus possible to perform refresh control, while meeting the high load demand of the vehicle, by predicting the power generated under the refresh control, and makes a determination based on the permissible charge amount of the battery 20. Thus, poor acceleration and unintended acceleration of the vehicle can be curbed or prevented.

When the battery 20 cannot be charged with the power generated under the refresh control, and no high load demand is made on the FC stack 10 any longer, it is determined whether, even in the presence of another high load demand, such as re-acceleration, the battery 20 can meet the high load demand. If so, refresh control is performed by reducing the oxidation gas. Thus, in this embodiment, sufficient chances and frequency of refresh control can be assured, making use of various means, such as determination on the feasibility of charging with power generated under refresh control, keeping the FC stack 10 from generating power, delivery of power from the battery 20, and determination on a response to another high-load demand.

While one embodiment according to the disclosure has been described above, the disclosure is not limited to the above configuration, but may be changed without departing from a technical concept of the disclosure.

What is claimed is:

1. A fuel cell system comprising:
a fuel cell that generates electric power by an electrochemical reaction using a fuel gas and an oxidation gas;
a stack voltage sensor that senses a stack voltage as a voltage of the fuel cell;
a battery operable to be charged with power and discharge power; and
a controller that controls power of the fuel cell, wherein the controller is programmed to:
  determine whether a high load demand that makes the stack voltage lower than a given voltage is made on the fuel cell;
  when the high load demand that makes the stack voltage lower than the given voltage is made on the fuel cell, cause the fuel cell to deliver the power commensurate with the high load demand;

perform refresh control of an electrode catalyst of the fuel cell by reducing the stack voltage to a refresh voltage at which the electrode catalyst is activated when the stack voltage becomes lower than the given voltage as a result of causing the fuel cell to deliver the power commensurate with the high load demand;

when the high load demand that makes the stack voltage lower than the given voltage is not made on the fuel cell, defer performance of the refresh control; and in a case where the high load demand is generated, perform the refresh control through current sweep for drawing electric current from the fuel cell, when the power generated by the refresh control using the current sweep is equal to or smaller than the power with which the battery can be charged.

2. The fuel cell system according to claim 1, wherein the refresh voltage is equal to or lower than the given voltage.

3. The fuel cell system according to claim 1, wherein the given voltage is the stack voltage obtained from a relationship between the stack voltage at which the refresh control is started, and an amount of degradation of the electrode catalyst when the refresh control is performed, the given voltage being the stack voltage at or above which the degradation of the electrode catalyst occurs due to the refresh control.

4. The fuel cell system according to claim 1, wherein in the case where the high load demand is generated, the controller is programmed to keep the fuel cell from generating electric power, when the power generated by the refresh control using the current sweep for drawing electric current from the fuel cell is larger than the power with which the battery can be charged, to cause the battery to deliver the power commensurate with the high load demand, and then to perform the refresh control through the current sweep, when the power generated by the refresh control using the current sweep is equal to or smaller than the power with which the battery can be charged.

5. The fuel cell system according to claim 1, wherein an amount of degradation of the electrode catalyst when the refresh control is performed at the stack voltage equal to or higher than the given voltage is equal to or larger than the amount of degradation of the electrode catalyst when the refresh control is performed at the stack voltage smaller than the given voltage.

6. A fuel cell system, comprising:

a fuel cell that generates electric power by an electrochemical reaction using a fuel gas and an oxidation gas;

a stack voltage sensor that senses a stack voltage as a voltage of the fuel cell;

a battery operable to be charged with power and discharge power; and a controller that controls power of the fuel cell, wherein the controller is programmed to:

determine whether a high load demand that makes the stack voltage lower than a given voltage is made on the fuel cell;

when the high load demand that makes the stack voltage lower than the given voltage is made on the fuel cell, cause the fuel cell to deliver the power commensurate with the high load demand;

perform refresh control of an electrode catalyst of the fuel cell by reducing the stack voltage to a refresh voltage at which the electrode catalyst is activated when the stack voltage becomes lower than the given voltage as a result of causing the fuel cell to deliver the power commensurate with the high load demand;

when the high load demand that makes the stack voltage lower than the given voltage is not made on the fuel cell, defer performance of the refresh control;

in a case where the high load demand is generated, keep the fuel cell from generating electric power, when the power generated by the refresh control through current sweep for drawing electric current from the fuel cell is larger than the power with which the battery can be charged, to cause the battery to deliver the power commensurate with the high load demand, and then to perform the refresh control by reducing the oxidation gas, when the power generated by the refresh control using the current sweep is still larger than the power with which the battery can be charged, and, where the high load demand is not made on the fuel cell, and the power commensurate with the high load demand, for a case where the high load demand is generated again, is equal to or smaller than the power that can be delivered by the battery.

* * * * *